United States Patent [19]

Kaarlela

[11] 4,067,657
[45] Jan. 10, 1978

[54] CAM LOCK RETAINING MEANS FOR RIPPER TIPS

[75] Inventor: Willard O. Kaarlela, Chillicothe, Ill.

[73] Assignee: Caterpillar Tractor Co., Peoria, Ill.

[21] Appl. No.: 658,554

[22] Filed: Feb. 17, 1976

[51] Int. Cl.² .............................................. E02F 9/28
[52] U.S. Cl. .................................. 403/317; 403/324; 403/379; 37/142 R
[58] Field of Search ............... 403/317, 153, 154, 155, 403/156, 324, 362, 379, 378, 148, 147; 299/92, 91; 85/5 N, 1 SS, 5 B; 37/142 R, 142 A

[56] References Cited

U.S. PATENT DOCUMENTS

| | | | |
|---|---|---|---|
| 1,065,866 | 6/1913 | Fraley | 403/362 |
| 1,288,786 | 12/1918 | Wilschewski | 403/154 |
| 1,444,352 | 2/1923 | Mason | 403/148 |
| 1,480,185 | 1/1924 | Setter | 403/156 |
| 1,926,798 | 9/1933 | Baumbach | 85/5 B |
| 2,399,581 | 4/1946 | Spooner | 85/5 B |
| 2,822,986 | 2/1958 | Schreier | 85/5 B |
| 3,027,201 | 3/1962 | Blazek et al. | 305/58 |
| 3,309,864 | 3/1967 | Arndt et al. | 74/251 R X |
| 3,498,653 | 3/1970 | McCreery | 403/322 |
| 3,624,827 | 11/1971 | Liess | 37/142 R |
| 3,831,298 | 8/1974 | Helton et al. | 37/142 A |
| 3,912,020 | 10/1975 | Rockwell | 37/142 R |

*Primary Examiner*—Andrew V. Kundrat
*Attorney, Agent, or Firm*—Phillips, Moore, Weissenberger, Lempio & Majestic

[57] ABSTRACT

A ripper tip is mounted on the end of a shank by a cylindrical pin disposed in aligned bores formed therethrough. A camming member is reciprocally mounted in each end of the pin to each have a first end thereof engage the tip in bearing contact therewith. A set screw is threadably mounted in the pin to engage a second end of each camming member to urge it into such bearing contact. In a first described embodiment of this invention, the camming member is disposed perpendicular relative to the longitudinal axis of the pin and the set screw is disposed in parallel relationship relative thereto whereas in a second embodiment the camming member and set screw are each disposed at an acute angle relative to the longitudinal axis of the pin.

16 Claims, 5 Drawing Figures

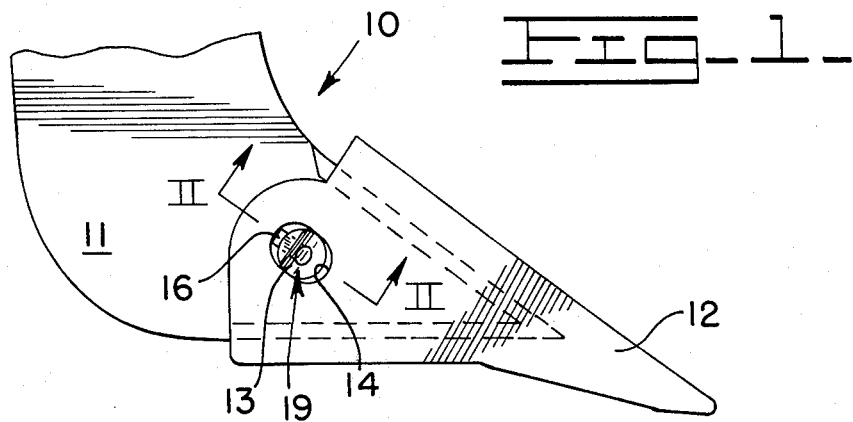
Fig_1_
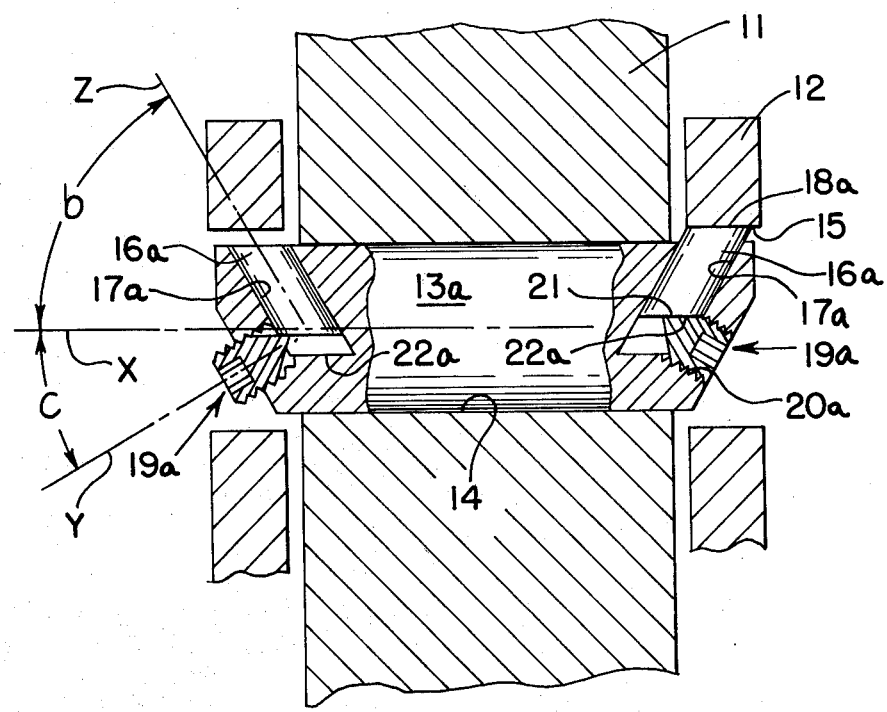
Fig_2_

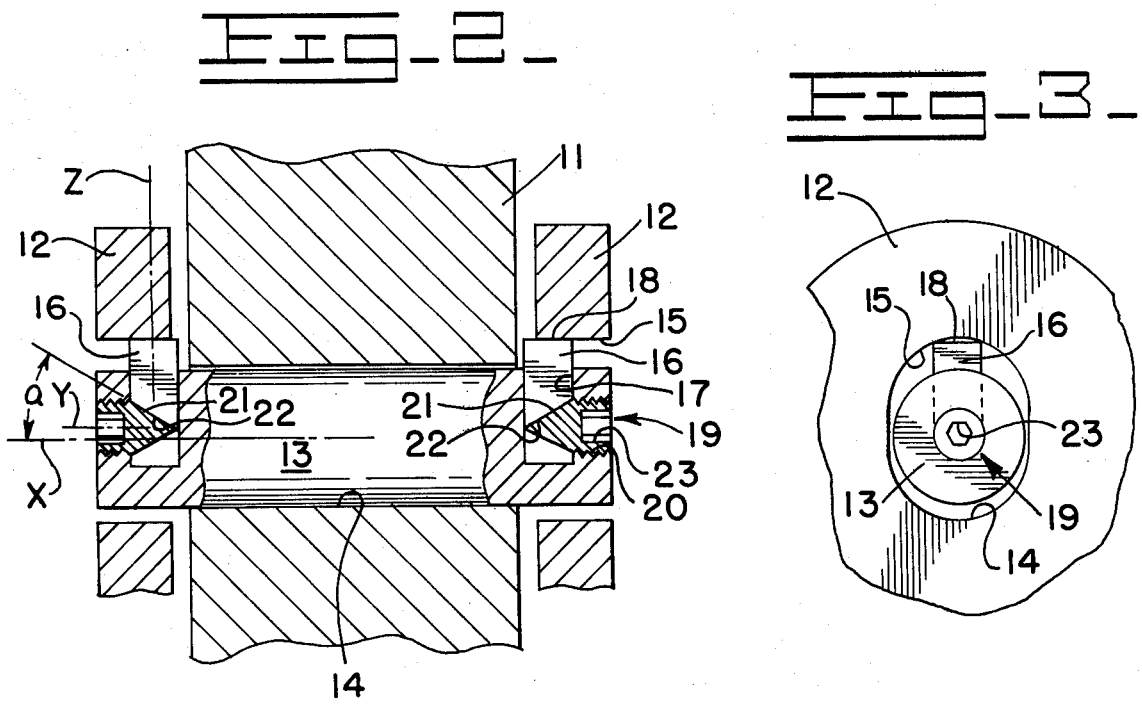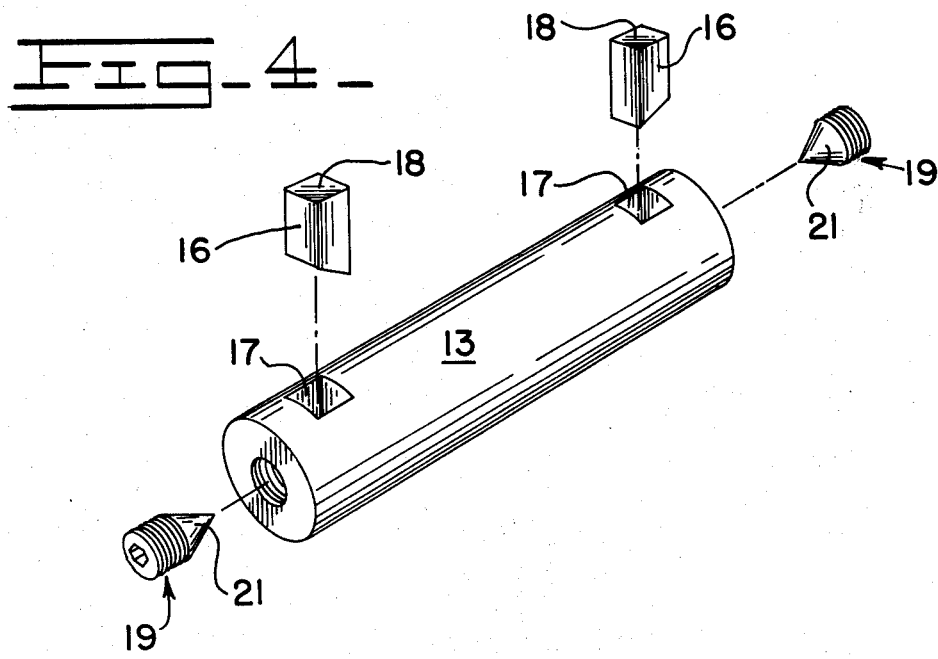

CAM LOCK RETAINING MEANS FOR RIPPER TIPS

BACKGROUND OF THE INVENTION

A conventional ripper tip for construction vehicles is retained on a shank by a cylindrical pin. The pin is normally locked in place by a spring or the like to retain the tip on the shank. Due to clearances therein, vibratory and inertial forces may tend to wear the pin and/or tip rapidly to thus require premature repair or replacement thereof. U.S. Pat. No. 3,831,298 suggests a solution to this problem by providing means for expanding the pin into locked relationship with the tip and shank.

SUMMARY OF THIS INVENTION

An object of this invention is to provide an economical, non-complex and improved cam lock retaining means for locking the above type of earthworking tip and pin on a support member. The retaining means comprises a camming member movably mounted in the pin and having a first end thereof engaging the tip in bearing contact therewith. A camming means is movably mounted in the pin to engage a second end of the camming member to urge it to such bearing contact with the tip.

BRIEF DESCRIPTION OF THE DRAWINGS

Other objects of this invention will become apparent from the following description and accompanying drawings wherein:

FIG. 1 is a partial side elevational view of a ripper tip mounted on a shank and retained thereon by a pin and cam lock retaining means of this invention;

FIG. 2 is an enlarged sectional view of the retaining means, taken in the direction of arrows II—II in FIG. 1;

FIG. 3 is a side elevational view of the retaining means;

FIG. 4 is an exploded, isometric view of the pin and retaining means; and

FIG. 5 is a view similar to FIG. 2, but illustrating a modification of the retaining means.

DETAILED DESCRIPTION

FIG. 1 illustrates a work tool 10 for a construction vehicle comprising a shank or support member 11 having a hardened earthworking or ripper tip 12 mounted on an end thereof. Although this invention is hereinafter described for ripper tip applications, it should be understood that the invention is equally adaptable for use with tips employed on loader buckets, scraper blades and other types of related work tools. The primary purpose of this invention is to provide a cam lock for retaining the tip on the shank to continuously maintain a rigid connection therebetween.

Referring to FIGS. 2-4, a pair of identical retaining means are especially adapted for use with a cylindrical pin 13, having a longitudinal axis X and disposed in aligned bores 14 and 15 formed through the support member and tip, respectively. Each retaining means comprises a camming member 16 reciprocally mounted in a bore 17 formed in a respective end of the pin. The bore is disposed in perpendicular relationship relative to the longitudinal axis of the pin and has a square cross section which conforms with that of the camming member, i.e., square parallelepiped. Each bore 15 has an oblong configuration defined by major and minor axes and camming member 16 is movable in the direction of such major axis.

A first flat end 18 of the camming member engages surface portions of the tip, defining oblong-shaped bore 15, in bearing contact therewith. A camming means, shown in the preferred form of a set screw 19, is threadably mounted in a threaded bore 20 which intersects bore 17. The set screw terminates at its inner end at a conically shaped bearing surface 21 which engages a second flat end 22 of camming member 16.

A socket 23 is formed on an outer end of the set screw to receive the head of a standard allen wrench therein whereby rotation of the set screw will move it inwardly. Such movement will urge camming member 16 upwardly to effect the bearing contact between end 18 of the camming member and tip 12. It should be further noted in FIG. 2 that such camming action will further function to urge lower surface portions of the pin into bearing contact with the shank.

Although surfaces 21 and 22 substantially assume line contact therebetween, surface 22 of the camming member could be semi-conically shaped to match conical surface 21 of the set screw to thus maintain an area contact therebetween. Likewise, the outer surface of the camming member defining end 18 thereon could be shaped to match the arcuate shape of bore 15. In addition, although camming member 16 and bore 17 are shown as having square cross sections, it should be understood that the same could be formed with other shaped cross sections, such as circular.

The above-described cam lock retaining means is preferably duplicated on opposite ends of the pin, although one such cam lock retaining means may suffice for certain tip retaining applications. It should be further noted with respect to the FIGS. 1-4 embodiment that longitudinal axis Y of set screw 19 is disposed in parallel relationship with respect to longitudinal axis X of pin 13. Such disposition thus disposes respective contacting surfaces 21 and 22 of the set screw and camming member at an acute angle $a$ relative to the longitudinal axis of the pin, such angle approximating 30° in FIG. 2. A major axis Z of camming member 16 is disposed at least substantially perpendicular relative to axes Y and X.

FIG. 5 illustates a modification of the FIGS. 1-4 embodiment wherein identical numerals depict corresponding parts and constructions, but with numerals depicting modified constructions in FIG. 5 being accompanied by an "a". In particular, a generally cylindrical pin 13a is cammed into secured relationship between support member or shank 11 and tip 12 by retaining means comprising a camming member 16a and a camming means or set screw 19a. The camming member is a parallelepiped of the oblique rectangular type having its major axis Z disposed at an acute angle $b$ relative to longitudinal axis X of the pin.

A longitudinal axis Y of set screw 19a forms an acute angle $c$ respect to the longitudinal axis of the pin. In the embodiment illustrated, angle $b$ closely approximates 60° whereas angle $c$ closely approximates 30°. The complementary angles thus form a right angle between major axis Z of the camming member and longitudinal axis Y of the set screw.

It should be further noted that first end 18a of the camming member engages internal surface portions, defining bore 15, in bearing contact therewith. End 18a is disposed in parallel relationship relative to longitudinal axis X of pin 13a and with second end 22a of the camming member which engages conically shaped end 21 of the set screw. The rightwardly disposed retaining means in FIG. 5 is shown in its locked positon with set screw 19a screwed inwardly to effect a bearing contact at end 18a of the camming member and the leftwardly disposed retaining means is shown retracted. In particular, the set screw for the latter retaining means is shown in its threaded-out position whereby locking member 16a retracts downwardly into a bore 17a to dispose end 18a of the camming member at least substantially flush with the outer periphery of pin 13a to facilitate insertion thereof in bore 14.

The method for mounting and locking ripper tip 12 on shank 11 by the FIGS. 1-4 cam lock retaining means will now be described. The tip is initially mounted on the shank to dispose bores 14 and 15 in axial alignment, as illustrated in FIG. 2. Prior to insertion of pin 13 into the bores, set screws 19 are retracted to place the outer surface of first end 18 of at least one of the camming members 16 in flush relationship with respect to the outer surface of the pin.

The pin is then inserted through the aligned bores to position it substantially as illustrated in FIG. 2. An allen wrench is then engaged with sockets 23 of the set screws and rotated to move the set screws axially inwardly to, in turn, move camming members 16 upwardly. If so desired, a torque wrench could be employed to drive the camming members into bearing contact with the ripper tip and to impart the desired locking force therebetween. The FIG. 5 cam lock retaining means embodiment may be assembled in a similar manner.

What is claimed is:

1. A work tool for construction vehicles comprising a support member,
a tip mounted on said support member,
a pin having a longitudinal axis and disposed in aligned bores formed through said support member and said tip, the bores formed through said tip each having an oblong configuration defined by major and minor axes and
cam lock retaining means mounted on said pin for locking said support member, tip and pin together comprising
a single camming member movably mounted in said pin and having a first end thereof engaging said tip in bearing contact therewith, said camming member movable in the direction of the major axis of a respective one of the bores formed through said tip, and
camming means movably mounted in said pin and having an end thereof engaging a second end of said camming member for urging the first end of said camming member into its bearing contact with said tip and for simultaneously urging said pin in bearing contact with said support member on an opposite side of said pin from whereat the first end of said camming member engages said tip in bearing contact.

2. The work tool of claim 1 wherein said support member constitutes a shank and said tip constitutes a hardened ripper tip mounted on a lower end of said shank.

3. The work tool of claim 1 wherein said camming member is closely fitted within a bore formed in said pin for reciprocation therein between a first position wherein the first end thereof is disposed in at least substantial flush relationship relative to outer surface portions of said pin and a second position whereat the first end thereof engages said tip in bearing contact therewith.

4. The work tool of claim 3 wherein a major axis of said camming member is disposed at least substantially perpendicular relative to the longitudinal axis of said pin.

5. The work tool of claim 3 wherein said camming member is disposed at an acute angle relative to the longitudinal axis of said pin.

6. The work tool of claim 5 wherein said angle closely approximates 60°.

7. The work tool of claim 3 wherein said camming member is shaped as a parallelepiped.

8. The work tool of claim 7 wherein said parallelepiped is square.

9. The work tool of claim 7 wherein said parallelepiped is oblique and rectangular.

10. The work tool of claim 1 wherein said camming means constitutes a set screw threadably mounted in said pin.

11. The work tool of claim 10 wherein an inner end of said set screw is conically shaped and engages the second end of said camming member.

12. The work tool of claim 10 wherein a longitudinal axis of said set screw is disposed in parallel relationship relative to the longitudinal axis of said pin.

13. The work tool of claim 12 wherein a major axis of said camming member is disposed in at least substantial perpendicular relationship relative to the longitudinal axes of said pin and said set screw.

14. The work tool of claim 10 wherein the longitudinal axis of said set screw is disposed at an acute angle relative to the longitudinal axis of said pin.

15. The work tool of claim 14 wherein said angle at least closely approximates 30°.

16. The work tool of claim 1 wherein one of said cam lock retaining means is mounted on each end of said pin.

* * * * *